Aug. 11, 1942.  S. E. HILBLOM  2,293,001
MOWER
Filed Sept. 18, 1941    2 Sheets-Sheet 2
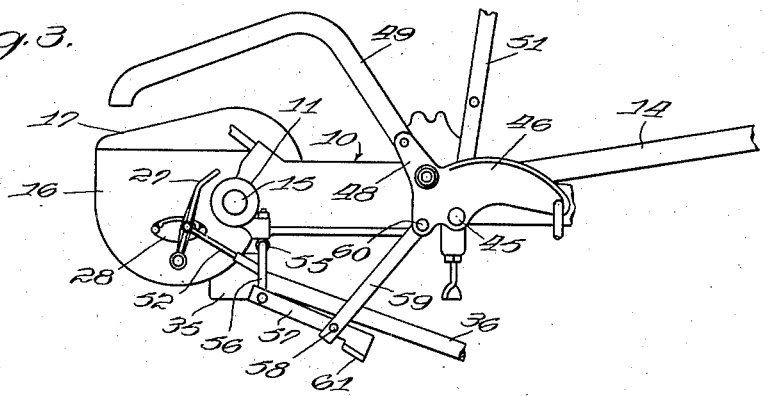
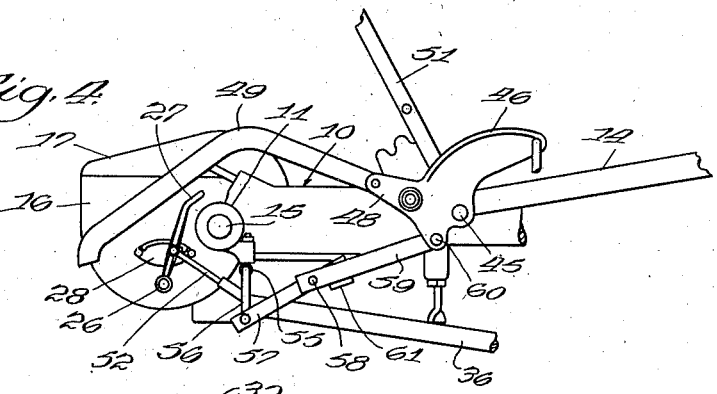
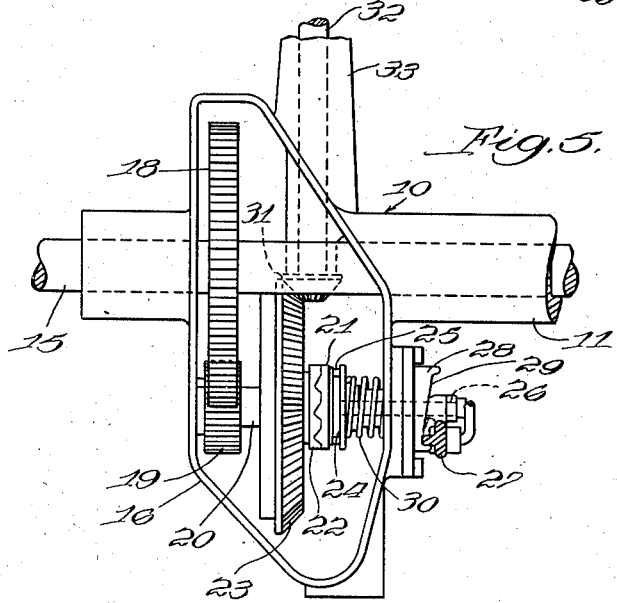
Inventor:
Samuel E. Hilblom.
By Paul C. Pippel
Atty.

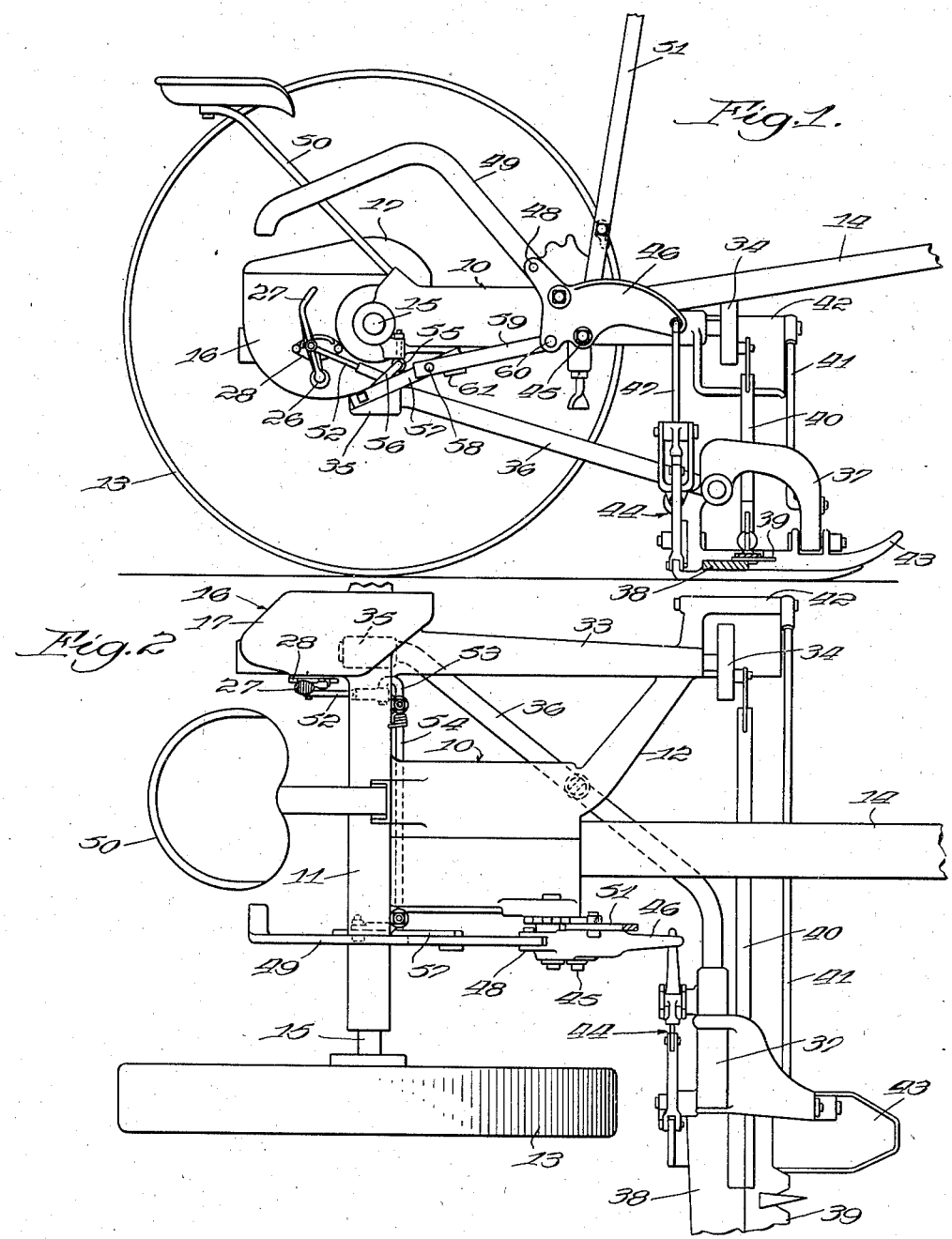

Patented Aug. 11, 1942

2,293,001

UNITED STATES PATENT OFFICE 2,293,001

MOWER

Samuel E. Hilblom, Chicago, Ill., assignor to International Harvester Company, a corporation of New Jersey Application September 18, 1941, Serial No. 411,266

4 Claims. (Cl. 56—274)

This invention relates to a mower and, more particularly, to control means for the actuation of the driving clutch by particular movement of the mower cutting mechanism.

In mowers, particularly of the horse drawn type, wherein the power for driving the cutting mechanism is derived through gearing driven by the drive wheel, there is provided a clutch which is operable to engage or disengage the driving means, to start or stop the cutting mechanism at the will of the operator. In mowers of certain types it has heretofore been found expedient to connect the clutch with the cutting mechanism so that the clutch would be disengaged when the cutting mechanism was moved to an inoperative position. In a conventional construction, the cutter-bar of the cutting mechanism is mounted for vertical movement from a transversely extending, operative position to a vertically extending raised or transport position. Also, in such construction there is provided lifting and lowering means for lifting and lowering the cutter-bar. This means is connected to the driving clutch in such a manner that operation of said means to raise the cutter-bar disengages the clutch and automatically stops operation of the cutting mechanism.

Although the aforesaid feature of automatic disengagement of the clutch is desirable, it is also desirable that the clutch be capable of disengagement even though the cutter-bar remain in operative position. Various mechanisms have been heretofore provided for effecting a connection between the clutch and the lifting and lowering means, this connection being adaptable to permit the clutch to be disengaged while the cutter-bar was not raised. However, it has been found that certain of these connections do not facilitate reengagement of the clutch after the cutter-bar has been raised and is then subsequently lowered, it being necessary to reengage the clutch manually. Other disadvantages in prior linkages have centered about the rather complicated and expensive structures thereof.

The principal object of the present invention is to provide an improved control means for the clutch of a mower of the type referred to above.

An important object is to provide a connection between the cutting mechanism and driving clutch which is capable of transmitting movement of the cutting mechanism to the clutch control means for the purpose of engaging and disengaging the clutch, according to whether the cutting mechanism occupies certain positions, particularly raised and lowered positions.

An important object is to provide the connecting means in the form of linkage which may be released or collapsed by the operator so that the clutch means may be operated or the cutting mechanism raised or lowered independently of the functions of each other.

And another object is to provide means which may be readily adapted to and installed in a mower of conventional construction.

Briefly and specifically, these and other important objects of the invention are achieved in one preferred manner by a construction which includes a mower frame having a cutter-bar mounted for movement from an operative position to a raised or transport position. The mower includes driving mechanism having a clutch which is connectible or disconnectible to start and stop the sickle in the cutter-bar. Means is provided for raising and lowering the cutter-bar. According to the present invention a connection is provided between this means and the clutch, so that raising of the cutter-bar disengages the clutch, and lowering of the cutter-bar reengages the clutch. An important feature of the invention is the connection which consists of a pair of links pivoted together and provided with an over-center lock. This connection is normally interposed between the cutting mechanism and the clutch, and serves to disengage the clutch when the cutting mechanism is raised; however, the over-center lock may be released or broken so that the members may have movement relative to each other, in which case the clutch may be disengaged independently of the raising of the cutter-bar.

A more complete understanding of the foregoing and other features of the invention may be had from the following detailed description taken in conjunction with the accompanying sheets of drawings, in which:

Figure 1 is a side elevational view of a mower embodying the invention, the inner wheel of the mower being removed to facilitate the disclosure;

Figure 2 is a plan, elevational view of the same, the left-hand wheel being omitted;

Figure 3 is a fragmentary side elevational view showing the positions of various parts when the connection between the clutch and the lifting and lowering means is released;

Figure 4 is a view similar to the illustration in Figure 3, showing the manner in which the clutch may be disengaged automatically upon operation of the raising and lowering means; and, Figure 5 is an enlarged view, partly in section, showing the clutch and clutch control means.

The mower chosen for the purposes of illustration is of a generally conventional type, although it will be understood that any particular form of mower is suitably adapted for use with the present invention. As shown, the mower comprises generally a frame 10 having a transverse rear axle structure 11, and forwardly extending frame structure 12 carried on a pair of wheels 13. A draft tongue 14 is rigidly connected to the forward frame structure 12 and is used in the usual manner to draw the mower over the field.

As illustrated in Figure 1, the left-hand rear wheel 13 is a drive wheel and is keyed to a driving axle 15. The left-hand side of the rear axle structure 11 is enlarged to provide a gear casing 16, through which the axle 15 extends. This housing is normally covered by a removable cover-plate 17. Within the housing the axle 15 has keyed thereto a driving gear 18 which meshes with a spur gear 19 carried on a counter-shaft 20. The shaft 20 parallels the rear axle 15 and has keyed thereto a driving clutch part 21. A driven clutch part 22 is mounted on the shaft 20 for rotation with respect thereto, and is connected for rotation with a bevel gear 23. This gear is, of course, rotatable with respect to the shaft 20. The driving clutch part 21 is provided with a peripheral groove 24 which is engaged by a shipper or clutch yoke 25. This yoke is rigidly carried at the end of a transversely extending rod 26 carried for a sliding movement transversely of and with respect to the housing 16. The rod extends outside the housing at the right side thereof and carries rigidly thereon an upstanding control element in the form of a foot pedal or lever 27. The right side of the housing has rigidly secured thereto a cam plate 28 having an inclined surface 29. As shown in Figure 5, the foot pedal 27 is in its rearwardmost position and is accordingly at the lowest point of the surface 29 of the cam 28. Forward movement of the lever 27 causes the lever to ride up the surface 29 of the cam and thus to draw the shipper rod 26 transversely to the right. This movement releases the driving clutch part 21 from the driven clutch part 22. Return of the pedal 27 to its rearwardmost position permits reengagement of the parts 21 and 22. A coil spring 30 surrounds the shaft 20, between the right-hand wall of the housing 16 and the clutch part 21, and facilitates reengagement of the clutch parts.

Engagement between the clutch parts 21 and 22 causes the bevel gear 23 to be rotated with the shaft 20 as the mower is drawn over the ground. The bevel gear meshes with a smaller bevel gear 31 carried on a shaft 32, which extends longitudinally of the mower frame in a supporting housing 33. This shaft extends at the forward end of the housing 33 and carries thereon a fly-wheel and eccentric 34.

The under side of the frame 10, at the left side thereof, carries a depending support 35, in which is journaled one end of a forwardly and diagonally extending supporting or coupling bar 36. The forward outer end of this bar carries thereon in any suitable manner a yoke 37, to which is connected, on a longitudinal, horizontal axis, a transversely extending cutter-bar 38. The cutter-bar carries a sickle 39 of the usual form, which is connected by a pitman 40 to the eccentric 34. A transversely extending brace rod 41 connects the yoke 37 and supporting structure 42 at the extreme forward end of the frame structure 10. In this manner the cutter-bar and sickle, which comprise the major parts of the cutting mechanism, are mounted for movement vertically with respect to the mower frame 10. The cutter-bar includes the usual shoe 43 which engages and rides the ground.

A rearward portion of the yoke 37 carries the usual gag lever linkage, generally indicated at 44. This linkage may be of any conventional form and has not, therefore, been described in greater detail. The right-hand side of the frame 10, adjacent the forward end thereof, is provided with a transversely extending pivot 45, on which is pivotally mounted a lifting member 46. One end of the member 46 is pivotally connected by a link 47 to the gag lever linkage 44. The end of the member 46 includes a portion 48 which is rigidly connected to a foot lever 49. This foot lever extends rearwardly and downwardly over the rear axle structure 11 and is convenient to an operator riding an operator's station 50 on the mower. An intermediate portion of the member 46 rigidly carries an upstanding hand lever 51. The structure just described provides means by which the cutting mechanism may be raised and lowered. This means may be of any suitable form, the present structure being illustrated only for the purposes of facilitating the disclosure of the present invention. It will be understood that the foot lever 49 and hand lever 51 may be operated simultaneously in a downward and rearward direction to pivot the member 46 about the pivot 45 to actuate the linkage 47, which in turn operates the gag lever linkage 44 for raising the cutter-bar 38 about its longitudinal horizontal pivotal connection with the shoe 37. This function is common to mowers of the type illustrated, and is well understood by those versed in the art.

During normal operation of the mower, the clutch parts 21 and 22 are engaged so that the fly-wheel or eccentric shaft 32 is driven by the drive wheel 13 through the medium of the gears 18, 19, 23, and 31. According to the present invention, means has been provided for actuating the clutch according to the movement of the cutting mechanism. As best shown in Figure 1, the foot pedal 27 has connected to an intermediate portion thereof a forwardly extending link 52. This link is in turn connected to a downwardly and rearwardly extending arm 53 of a transverse rock-shaft 54. This rock-shaft is journaled in bearings 55 at the forward side of the axle structure 11, and extends transversely of the frame 10, and has its right-hand end provided with an integral, downwardly and rearwardly extending arm 56. The arm 56 is pivotally connected to one end of a member in the form of a link 57. The other end of the member 57 is pivotally connected, at 58, to a second member in the form of a link 59. The link 59 is, in turn, pivotally connected, as at 60, to a lower rear portion of the lifting member 46. The extreme end of the link 57 is provided with a flange or ear portion 61, which extends transversely beneath the proximate portion of the link 59. As shown in Figure 1, the links 57 and 59 are positioned with respect to their interconnecting pivot 58 and the flange 61 so as to provide a releasable means in the form of an over-center lock. This lock, as will presently appear, can be readily released or broken by downward pressure applied at the operator's station.

In the operation of the mower, the cutter-bar 38 assumes its usual operating position, extending laterally of the frame 10. When it is desired to raise the cutting mechanism either to transport position or to a height sufficient to allow the cutter-bar to pass over an obstruction in the field, the operator moves either or both the foot lever 49 and the hand lever 51. This operation results in rocking movement of the lifting member 46, which in turn, in the conventional manner, raises the cutting mechanism through the medium of the gag lever linkage 44. When the member 46 is rocked rearwardly, the lower portion thereof, at 60, which provides the connection to the link 59, is moved forwardly. This forward movement is transmitted to the arms 56 and 53 of the rock-shaft 54 and, in turn, to the foot pedal 27. The resulting forward movement of the foot pedal 27 disengages the clutch parts 21 and 22, and stops the drive to the sickle 39. When the cutting mechanism is lowered, the member 46 rocks in the opposite direction and restores the parts to the positions shown in Figure 1. The positions of the parts when the cutting mechanism is raised are illustrated in Figure 4, the clutch pedal 27 being moved forwardly and the clutch parts being disengaged.

It often becomes desirable for the operator to disengage the driving mechanism without raising the cutting mechanism. According to the present invention, the releasable means provided by the links 57 and 59 accommodates this desire. As shown in Figure 1, the links 57 and 59 are locked by the releasable means or over-center lock, consisting of the association of the links, the pivot 58, and the flange or ear 61 on the link 57. From his position on the seat 50, the operator may, with his foot, press downwardly on the pivotal connection between the links 57 and 59, thus releasing or breaking the lock between these parts. The positions of the parts as thus released are shown in Figure 3. By a continued downward pressure on the linkage, the operator may release the clutch immediately; or, he may press on the link sufficiently to break the lock and then separately move the foot pedal 27 forwardly to a position in which the clutch parts are disengaged. The lock between the links 57 and 59 may be restored by a rearward movement of the foot pedal 27 to the position in which the clutch parts are reengaged.

It will be seen from the foregoing description of the structure and operation of the invention that the clutch may be engaged or disengaged, and that the cutting mechanism may be raised and lowered independently of each other. More particularly, it is significant that the clutch may be disengaged without the raising of the cutter-bar. The means providing for this releasable connection consists of the relatively movable parts formed of the links 57 and 59 and over-center locking means provided thereby. Other advantages and features of the construction will be apparent to those skilled in the art. It will be understood, of course, that the foregoing disclosure is of only a preferred embodiment of the invention, and that numerous modifications and alterations may be made therein without departing from the spirit and scope of the invention as defined in the appended claims.

What is claimed is:

1. For a mower having a frame, cutting mechanism connected to the frame for movement with respect thereto, and driving mechanism for the cutting mechanism including a clutch: means connecting the cutting mechanism and the clutch for actuating the clutch when the cutting mechanism moves with respect to the frame, said means including a pair of members interconnected to form a toggle normally holding the members in position for actuation of the clutch by said movement of the cutting mechanism and releasable for actuation of the clutch independently of said movement of the cutting mechanism.

2. For an agricultural implement having a frame, an implement part connected to the frame for movement with respect thereto, and driving mechanism for the implement including disengageable means: means connecting the implement part and the disengageable means for actuation of the latter by movement of the implement part, said means including a pair of members interconnected to form a toggle normally holding the members in position for actuation of the disengageable means by movement of the implement part and releasable for actuation of the disengageable means independently of movement of the implement part.

3. For a mower having a frame, cutting means connected to the frame for movement with respect thereto, and driving means for the cutting means including a clutch: means connected between the clutch and cutting means and including linkage having a pair of links, means interconnecting the links and including an over-center lock lockable to hold said links for movement together for actuation of the clutch by movement of the cutting means with respect to the frame and releasable to permit relative movement of said links for actuation of the clutch and movement of the cutting means independently of each other.

4. For a mower having a generally horizontal frame including an operator's station, cutting means connected to the frame for movement with respect thereto, and driving mechanism for the cutting means including a clutch: means connecting the clutch and cutting mechanism and including a pair of links, means interconnecting the links including an over-center lock lockable to hold the links in a generally horizontal position adjacent the operator's station and for movement together for actuation of the clutch by movement of the cutting means with respect to the frame, said over-center lock being releasable by pressure applied downwardly at the operator's station to permit relative movement of said links for actuation of the clutch and movement of the cutting means independently of each other.

SAMUEL E. HILBLOM.